(12) United States Patent
Purohit (10) Patent No.: US 9,642,106 B2
(45) Date of Patent: May 2, 2017

(54) DYNAMIC PRIMARY SCRAMBLING CODE DISAMBIGUATION

(71) Applicant: SpiderCloud Wireless, Inc., San Jose, CA (US)

(72) Inventor: Darshan Purohit, San Jose, CA (US)

(73) Assignee: SpiderCloud Wireless, Inc., Milpitas, CA (US)

( * ) Notice: Subject to any disclaimer, the term of this patent is extended or adjusted under 35 U.S.C. 154(b) by 326 days.

(21) Appl. No.: 13/848,564

(22) Filed: Mar. 21, 2013

(65) Prior Publication Data

US 2014/0287759 A1    Sep. 25, 2014

(51) Int. Cl.
*H04W 36/00*    (2009.01)
*H04W 56/00*    (2009.01)
*H04W 84/04*    (2009.01)

(52) U.S. Cl.
CPC ... *H04W 56/0015* (2013.01); *H04W 36/0083* (2013.01); *H04W 84/045* (2013.01)

(58) Field of Classification Search
CPC ......... H04W 36/0072; H04W 56/0015; H04W 36/0083; H04W 84/045
USPC ...................................................... 455/437
See application file for complete search history.

(56) References Cited

U.S. PATENT DOCUMENTS

| | | | |
|---|---|---|---|
| 2002/0051431 A1 | 5/2002 | Choi et al. | |
| 2002/0075833 A1 | 6/2002 | Dick et al. | |
| 2003/0091022 A1* | 5/2003 | Blanz | H04W 56/0015 370/350 |
| 2008/0025264 A1 | 1/2008 | Willenegger et al. | |
| 2009/0137246 A1* | 5/2009 | Xing | H04W 56/0035 455/434 |
| 2010/0323631 A1 | 12/2010 | Martin et al. | |
| 2011/0019638 A1* | 1/2011 | Hamel et al. | 370/331 |
| 2011/0110244 A1* | 5/2011 | Lin | 370/252 |
| 2011/0130144 A1* | 6/2011 | Schein et al. | 455/442 |
| 2012/0309394 A1* | 12/2012 | Radulescu | H04W 36/0055 455/436 |
| 2013/0210436 A1* | 8/2013 | Srinivasan et al. | 455/436 |

(Continued)

FOREIGN PATENT DOCUMENTS

WO    2013023159 A1    2/2013

OTHER PUBLICATIONS

International Search Report of PCT/US2014/031515, dated Aug. 27, 2014.

*Primary Examiner* — Qun Shen
(74) *Attorney, Agent, or Firm* — TechLaw LLP (57) ABSTRACT

Systems and methods are provided for resolving Primary Scrambling Code (PSC) ambiguity. A radio link having the same PSC as that reported by user equipment (UE) may be created on some or all internal cells which are chosen based on radio frequency (RF) proximity to a serving cell of the UE or one or more iterations of a PSC resolution set selection process. If the UE is reporting the PSC of one of these cells, the UE and a Node Bs will be able to successfully complete a synchronization procedure to add one of the radio links to the UE's active set, while any remaining created radio links can be deleted. After a certain number of successful radio link additions, the combination of the PSC and active set may be considered to be resolved, therefore, negating a need to resolve the PSC in subsequent soft handover requests.

14 Claims, 4 Drawing Sheets

(56) References Cited

U.S. PATENT DOCUMENTS

| 2013/0244653 A1* | 9/2013 | Song | H04W 56/001 |
| | | | 455/436 |
| 2013/0244669 A1* | 9/2013 | Das | H04W 24/02 |
| | | | 455/446 |
| 2014/0098753 A1* | 4/2014 | Kazmi | H04L 5/0091 |
| | | | 370/329 |

* cited by examiner

DYNAMIC PRIMARY SCRAMBLING CODE DISAMBIGUATION

TECHNICAL FIELD

The present invention relates to communication networks, and more particularly, to primary scrambling code (PSC) disambiguation using dynamic PSC resolution.

BACKGROUND

Cellular networks have traditionally been deployed in a homogenous manner. For example, a typical cellular network may comprise a plurality of macrocells that are fairly uniform in the coverage areas they support. In the case of $3^{rd}$ Generation Partnership Project (3GPP) Universal Mobile Telecommunications System (UMTS) networks, each of these macrocells is connected to a Radio Network Controller (RNC). The RNC generally effectuates radio resource management, as well as some mobility management functionality, such as facilitating handover, maintaining device state, and supporting layer 2 data-plane protocols.

There are some exceptions to the uniform deployment paradigm described above, such as picocell and femtocell networks that are deployed in conjunction with an overarching macrocellular network. That is, picocells and femtocells, which may be considered small cellular base stations or access points, connect to a service provider's macrocellular network via broadband connections, allowing the macrocellular network to be extended either for capacity augmentation or for extending the coverage (e.g., indoors). These picocells and femtocells may be deployed in the same frequency channel as the macrocellular network, in which case they are referred to as co-channel deployments, or in a different frequency channel, in which case they are referred to as dedicated channel deployments.

For example, in-building Distributed Antenna Systems (DASs), powered by picocells, are deployed sporadically within the shadow of the macrocellular network. These picocells are typically manually provisioned to connect to the same RNC that is serving the nearby macrocells, thus facilitating mobility in and out of the coverage area of the picocell. In recent years, there has been a rapid growth of consumer femtocells, which are typically standalone entities serving a limited area. Each of these consumer femtocells is typically connected to a femtocell gateway that interfaces the femtocells with the core network of the cellular service provider.

SUMMARY

Various aspects of examples of the invention are set out in the claims.

According to a first aspect of the present invention, a method comprises receiving a measurement report from user equipment (UE) including a primary scrambling code (PSC) indicative of a target cell. The method further comprises creating a radio link on each of a plurality of cells, including the target cell, that are associated with the PSC, and performing a synchronization procedure to add the created radio links to the UE's active set. Further still, the method comprises receiving a radio link restore indication for one of the created radio links associated with the target cell.

According to a second aspect of the present invention, an apparatus comprises a processor; and a memory including computer program code, the memory and the computer program code configured to, with the at least one processor, cause the apparatus to perform at least the following: receive a measurement report from user equipment (UE) including a primary scrambling code (PSC) indicative of a target cell; create a radio link on each of a plurality of cells, including the target cell, that are associated with the PSC; perform a synchronization procedure to add the created radio links to the UE's active set; and receive a radio link restore indication for one of the created radio links associated with the target cell.

According to a third aspect of the present invention, a computer program product is embodied on a computer-readable non-transitory medium and comprises computer code for receiving a measurement report from user equipment (UE) including a primary scrambling code (PSC) indicative of a target cell; computer code for creating a radio link on each of a plurality of cells, including the target cell, that are associated with the PSC; computer code for performing a synchronization procedure to add the created radio links to the UE's active set; and computer code for receiving a radio link restore indication for one of the created radio links associated with the target cell.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF CERTAIN EMBODIMENTS

The term handover can refer to the transfer of an ongoing communication session (e.g., a voice or data session) from one radio link to another radio link. The transfer of the on-going session can be to another network (e.g., to a network with a different radio access technology (RAT) or an inter-RAT handover), to another cell, to another sector of the same cell, to another frequency within the same cell, etc. Additionally, or alternatively, the various handover scenarios may be described in terms of inter-frequency and intra-frequency handover operations. Inter-frequency handover can refer to adding a radio link for service to the user equipment (UE) on a different logical entity which uses a different channel frequency, such as a neighboring cell operating on a different frequency. Inter-frequency handover can, but does not necessarily, include terminating the radio link on the source cell. Intra-frequency handover may refer to adding a radio link on a different logical entity which uses the same channel frequency.

Further, the term "cell" may be construed in different ways. For example, a cell can be considered a logical entity that manages a single radio channel (i.e., the typical definition in the context of UMTS). In other examples, a cell may be considered a logical entity that manages multiple radio channels, usually on different frequencies. In still other examples, a cell may be construed as a logical entity that manages multiple radio channels, on the same or different frequencies, that have been sectorized. In other scenarios, a cell can be considered a physical area covered adequately by radio frequency (RF) energy from a particular sector of a physical base station installation, which can include just one RF channel or multiple RF channels. In yet other examples, a cell can be construed as a physical area covered adequately by RF energy from all sectors of a physical base station installation, which can also include one or multiple RF channels.

In a hard handover, a connection to the existing radio link may be broken before the connection to the new radio link is established. In a soft handover, an existing radio link may be retained and used in parallel with one or more newly acquired radio links of the target cell. Some examples of a soft handover may include, but are not limited to the following: a UE moving from one cell to another cell, with both cells belonging to the same Node B; a UE moving between two cells, each of which belong to a different Node B, but with both Node Bs belonging to the same radio network subsystem (RNS); a UE moving between different cells belonging to different Node Bs, where the Node Bs belong to different RNSs; and a UE moving between different cells belonging to different Node Bs in different RNSs, where the Node Bs are connected to different RN controllers (RNCs) which in turn may be connected to different serving GPRS support nodes (SGSNs). The simultaneous connections in a soft handover may exist for a brief or substantial period of time. The term Node B can refer to a radio node, and may also be referred to as, e.g., a base station, access point, cell (as described above), and the like.

A handover can be initiated for a variety of reasons. For example, a UE that moves to another geographical area, which is outside of the coverage area of its existing cell, may initiate a handover to avoid termination of the on-going session. In another example, a handover to another cell may be initiated to free up resources at an existing cell. In yet another example, a handover can be used to improve interference from other channels. In order to initiate a handover, the UE must be aware of potential target cells (i.e., neighboring radio nodes) that are likely to accommodate the handover. The information regarding the neighboring radio nodes can often be provided in a listing that may generally be referred to as a neighbor list. In the context of an enterprise network, neighbor radio nodes may include both those radio nodes that are internal to the enterprise network and those that operate outside of the enterprise network.

Figure 1:
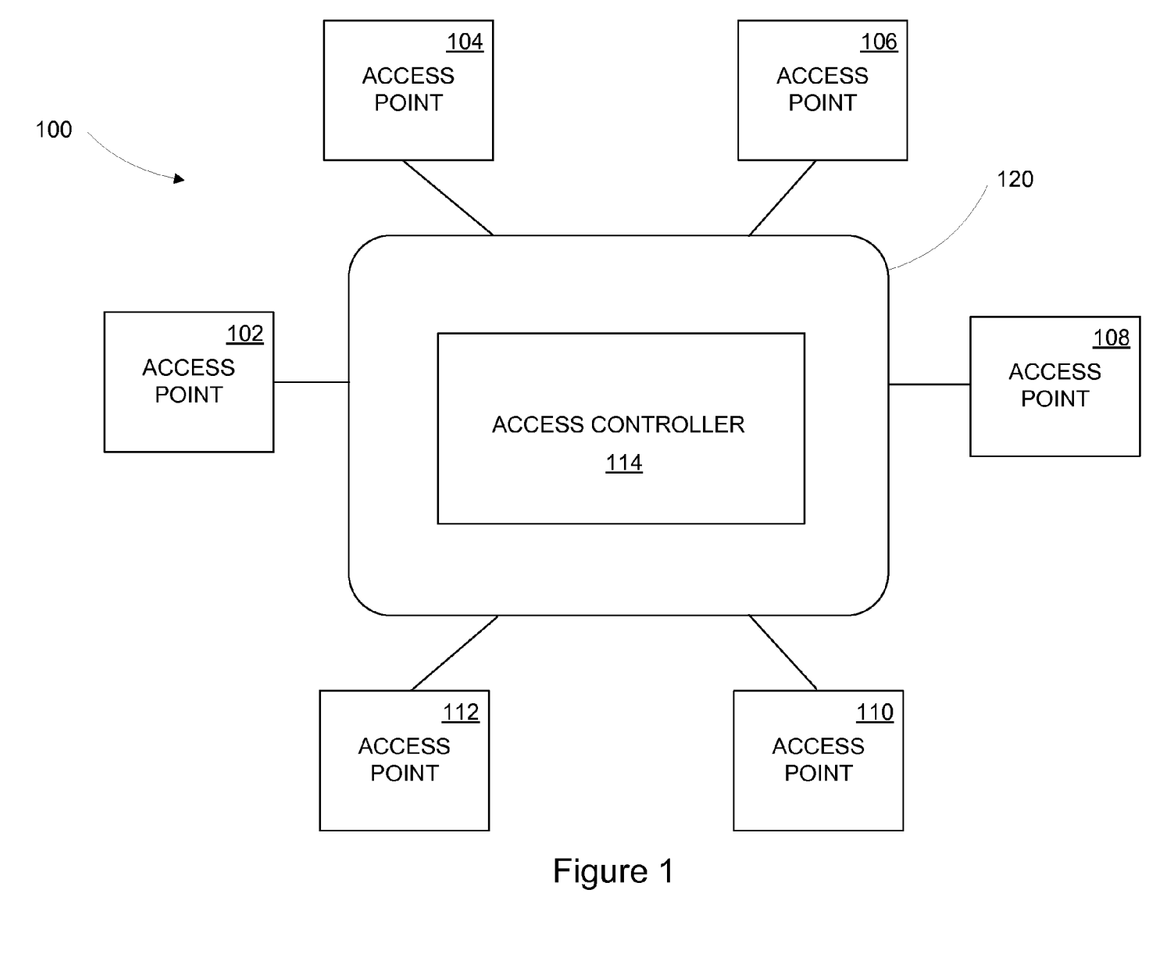
FIG. 1 illustrates an exemplary network within which the disclosed embodiments can be implemented.

FIG. 1 illustrates an example system 100 which may be used to accommodate some or all of the disclosed embodiments. The system 100 can, for example, be an enterprise network. The system 100 may include a plurality of access points referenced as 102, 104, 106, 108, 110, and 112. The access points that are illustrated in FIG. 1 may be connected, directly or indirectly, to an access controller 114 via a connection 120. Each of the access points 102, 104, 106, 108, 110, and 112 may be referred to as an "internal access point" (or an "internal radio node"). Each internal access point may communicate with a plurality of UEs, as well as other access points. It should be noted that while FIG. 1 illustrates a single central controller 114 that is distinct from the access points, it is also possible that the access controller is implemented as part of one or more access points. Further, a peer-to-peer network of access points, where each access point can initiate certain transmissions, including commands and/or data, to other access points without the involvement of a central controller, may be utilized.

An access point in accordance with various embodiments, may be an access router, a femtocell controller, or an integrated femtocell and controller. An access point may include antennas and receiver transmitter circuitry, where the receiver circuitry can include a decoder, while the transmitter circuitry may include an encoder. Furthermore, the various circuitry may be coupled by a bus to an I/O interface, processor, and memory, where the I/O interface may be utilized to couple the access point to some public network, e.g., the Internet and/or some other Internet Protocol (IP) network. The memory can include routines that cause the access point to operate in accordance with certain access point functionality when executed by the processor, as well as communications routines to cause the access point to perform various communications operations and implement various communications protocols. The memory may also include a base station/femtocell control routine that can include scheduling modules/functionality used to control transmission scheduling and/or communication resource allocation, as well as information regarding, e.g., active session, UE identifying information, other data stores and information collections that can be maintained within the access point and can be communicated to other elements or network equipment. Additionally, the access point may include one or more clocks controlled by the processor that may be utilized in timing/synchronization contexts.

An access controller may include interface ports for providing a physical connection between the access controller and a public network, e.g., the Internet, and for providing communication between the access controller and one or more access points via, e.g., an enterprise backhaul to provide a wired connection to the access points. The access controller may further include a processor configured to execute instructions, an interface to allow a user/operator to input and output information, a memory to store information, such as computer code or data (e.g., received from access points), and its own processor-controlled clock.

A UE can refer to some type of wireless device or terminal that can include receiver and transmitter antennas coupled to receiver and transmitter circuitry, respectively. The receiver circuitry can include a decoder while the transmitter circuitry may include an encoder. The receiver transmitter circuits can be coupled by a bus to a memory. The UE may further include a processor, under the control of one or more routines/instructions stored in memory that causes the UE to operate in accordance with various embodiments as described herein.

The example system 100 of FIG. 1 can be representative of a single network that may be adjacent to, or partially overlapping with, other networks. The collection of these other networks, which may comprise macro-cellular networks, femtocell networks and the like, can be referred to as external networks. Each "external network" may comprise one or more access controllers and a plurality of "external access points" (or "external radio nodes").

Figure 2:
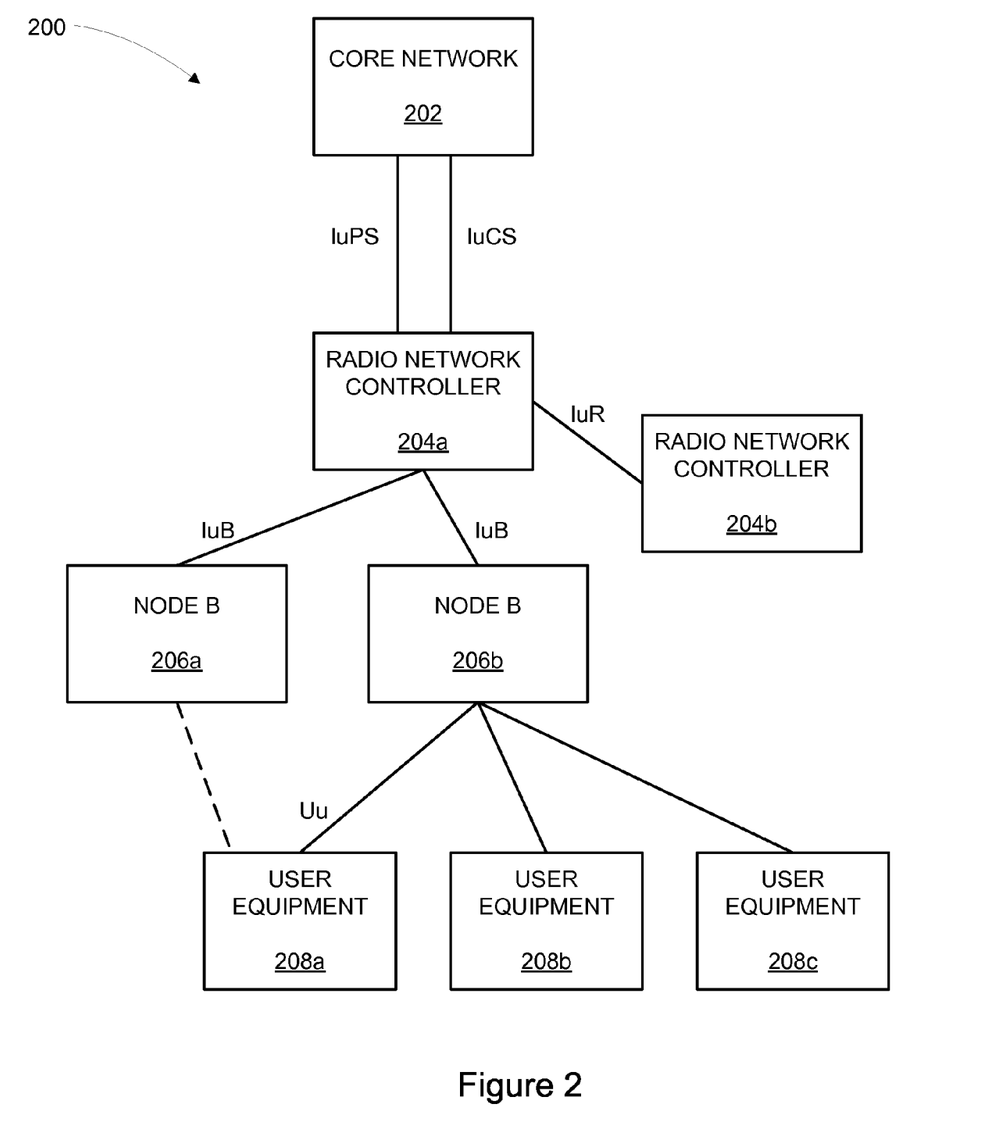
FIG. 2 illustrates an exemplary universal mobile telecommunication system (UMTS) terrestrial radio access network (UTRAN) within which the disclosed embodiments can be implemented.

FIG. 2 illustrates an example radio network 200, such as a UMTS Terrestrial Radio Access Network (UTRAN), that can accommodate various disclosed embodiments. The network that is depicted in FIG. 2 can include a Core Network (CN) 202, one or more RNCs 204a that are in communication with a plurality of Node Bs 206a and 206b (or base stations or radio nodes) and other RNCs 204b. Each Node B 206a, 206b can be in communication with one or more UEs 208a, 208b and 208c. There may be one serving cell controlling the serving radio link assigned to each UE 208a, 208b and 208c. However, as illustrated in FIG. 2 (with a dashed line), a UE (e.g., 208a) may be in communication with more than one Node B. For example, a Node B of a neighboring cell may communicate with one or more UEs of the current cell during handovers and/or to provide overload indications. It should be noted that while FIG. 2 depicts an example radio network in a UMTS system, the disclosed embodiments may be extended to operate with other systems and networks such as CDMA2000, WiMAX, LTE and the like.

Figure 3:
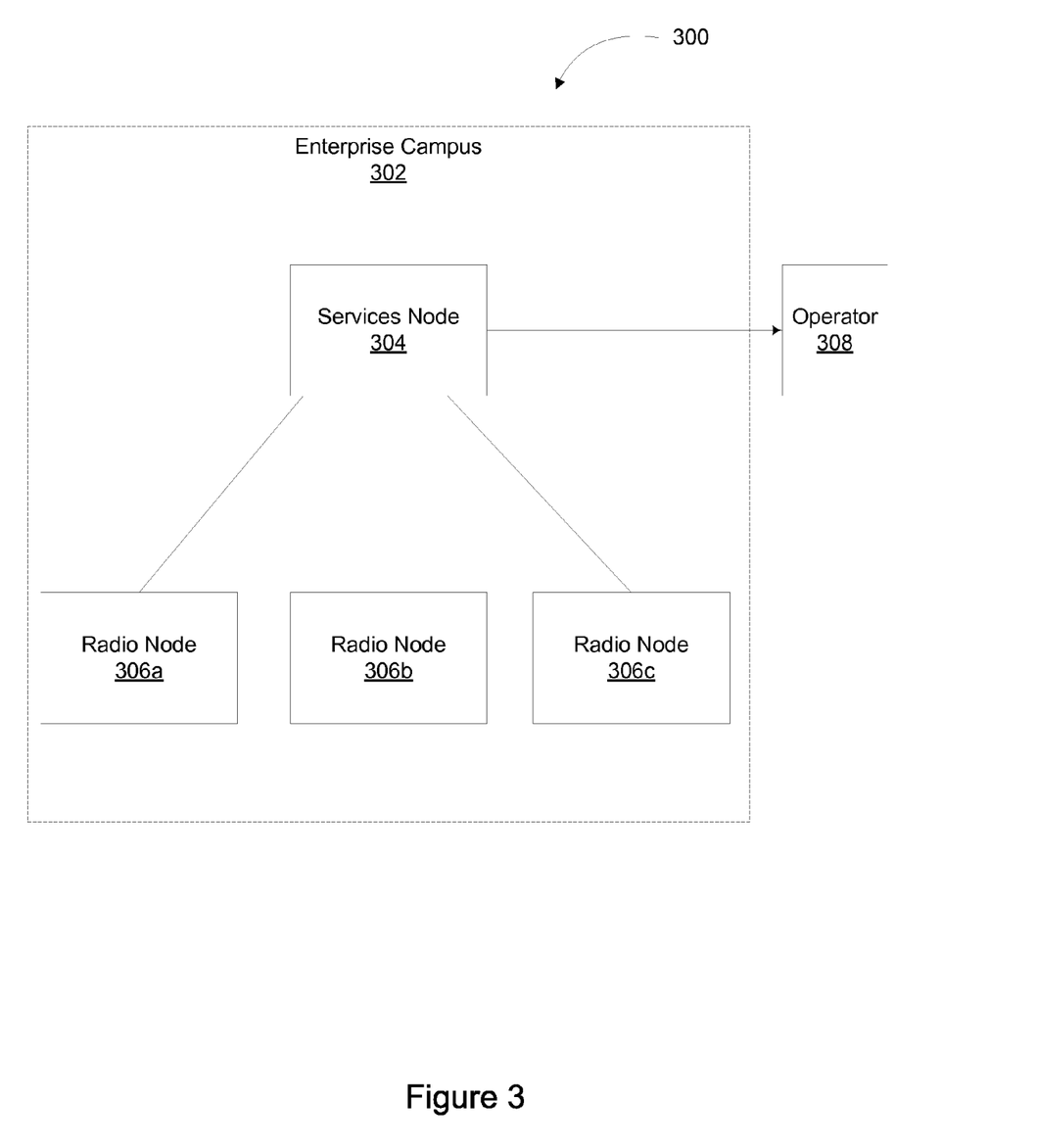
FIG. 3 illustrates an exemplary enterprise radio access network (ERAN) within which the disclosed embodiments can be implemented.

FIG. 3 illustrates an example local or enterprise Radio Access Network (ERAN) 300 that can be used to accommodate various disclosed embodiments. The ERAN 300 may include a services node 304 and a plurality of radio nodes 306a, 306b, and 306c. It should be noted that the ERAN 300 can include fewer or additional radio nodes and/or additional services nodes. The services node 304 can be thought of as the central control point of the overall cluster of radio nodes 306a, 306b, and 306c that are deployed throughout an enterprise local area network (LAN), i.e., enterprise campus 302. The services node 304, which can be deployed inside the enterprise LAN/campus 302 can provide, for example, session management for all mobile sessions delivered by the radio nodes 306a, 306b, and 306c. Each of the radio nodes 306a, 306b, and 306c may be in communication with one or more UEs (not depicted). The radio nodes 306a, 306b, and 306c can support a multi-radio architecture that allows a flexible upgrade path to higher user counts, as well as the ability to support different radio access technologies. In one example, the ERAN 300 configuration may allow for the creation of a unified mobile corporate network that integrates mobile workers distributed throughout an overall enterprise domain with centrally located corporate assets. FIG. 3 also illustrates an operator 308 that may be in communication with the services node 304, which can monitor the operations of the services node 304 and can provide various input and control parameters to the services node 304. The interactivity between the operator 308 and the services node 304 can be provided through, for example, a command line interface (CLI) and/or industry-standard device configuration protocols, such as TR-69 or TR-196.

It should be noted that while the exemplary radio networks that are depicted in FIGS. 1-3 all include a central controller, the disclosed embodiments are equally applicable to non-centralized network architectures. Such architectures can, for example, comprise isolated home Node Bs, radio nodes and/or a femtocell-based enterprise deployments that do not use a central controller.

As previously alluded to, a handover may utilize a neighbor list, where the neighbor list (or portions thereof) is transmitted to a UE by a radio node once the UE connects to the network/system. Neighbor lists for each cell may be constructed based on the results of Radio Environment Monitoring (REM) scans, as well as on the static configuration of neighbor base stations, radio nodes, cell, etc. provisioned through a configuration interface. In one example that is applicable to UMTS, the neighbor list (or portions thereof) may be transmitted to the UE using one or more measurement control messages (such as an intra-frequency neighbor list mapping Primary Scrambling Codes (PSCs) to internal cells of a services node), thereby providing the necessary information related to neighbors and any associated signaling parameters. A PSC may refer to a scrambling code utilized to scramble Primary Common Control Physical Channel (P-CCPCH) transmission from a Node B, and accordingly may be used to identify cells on the downlink channel (used along with Orthogonal Variable Spreading Factor (OVSF) codes that preserve orthogonality between downlink channels having different rates/spreading factors).

Accordingly, each UE can be instructed by the network as to which radio nodes to measure (based on a received PSC) and under what measured conditions to send various measurement report messages to the network. The set of radio nodes to measure reflects the neighbor list. Alternatively, a neighbor list need not be transmitted to the UE at all. Rather, the UE can conduct measurements associated with the PSCs on its own, and report the measured results to the network. For example, the UE can conduct appropriate RF measurements and transmit one or a number of measurement reports over the air to the radio node, where the measurement reports may be sent using UMTS measurement report messages that include, among other items, the type of measurement report (e.g., Event 1A/B/C/D, Event 2B/D/F, etc.), the relevant PSC's, and the measured RF signal strengths.

Based on the information received from the UE, the internal and external radio nodes can be mapped to facilitate handover operations to/from the appropriate internal or external cells. For example, and assuming that a UE has a current serving cell X and other cells, Y and Z, in its active set, and that the UE sends a measurement report indicating PSC A is measured with some strength, an RNC or services node may examine the neighbor list associated with serving cell X (and perhaps with cells Y and Z), to locate a neighbor of cell X (and perhaps Y and Z) with PSC A. If a neighbor cell (e.g., cell W) with PSC A is listed in one of the neighbor lists, then the RNC or services node may associate/map the UE's measurement of PSC A with that of cell W. If, on the other hand, a neighbor cell with PSC A is not found within the neighbor list(s), the measurement information associated with the received PSC A can be compared against information associated with PSCs on the neighbor list in order to validate the status of existing neighbors and/or to update the neighbor list. For example, a radio node may be added to, or deleted from, a UE's active set, or a UE's "best cell" and/or serving cell may be modified. In one scenario in the context of the above-noted example, a cell within the network with PSC A may be added to the neighbor list of cell X. Thus, when the PSCs that are received from the UE are mapped to internal radio nodes, the corresponding radio nodes are considered candidates for soft handover operations. It should be noted that the term "active set" can refer to the set of Node Bs, base stations, cells, etc., that the UE is simultaneously connected to.

In UMTS systems, handovers can be network controlled, but triggered by UE measurements. That is, UEs may detect and measure the strength of PSCs of other cells and communicate these PSCs back to, e.g., a serving RNC (SRNC) in the form of a measurement report. Different kinds of measurement events can be used depending on whether these measurements are intra-frequency or inter-frequency. It should be noted that additional considerations may exist for inter-frequency measurements, including the requirement on the UE to be in Compressed Mode in order to tune its receiver to another frequency.

Cells can be internally represented by a unique internal cell handle, or by a unique identifier pair made up of RNC and Cell identifiers (RNC ID, CellID). Communications that are conducted with the CN may be carried out using this unique identifier pair (RNC ID, CellID). However, the UE measurements are reported over the air interface with the associated PSCs. That is, identifiers relevant to mobility can be represented as a triplet (PSC, CellID, RNCID). In an ERAN, there are only 512 PSCs (ranging from 0 to 511) that are typically used/reused in a network deployment. In the intra-frequency neighbor list example discussed above, a maximum of only 32 unique PSCs may be utilized. These PSCs may be reused throughout the internal network, reused many times throughout the macro network, reused between different enterprise networks, and may be reused between the enterprise network and the macro network. Accordingly, handovers may require disambiguation of a particular PSC reported by a UE from a plurality of available PSCs.

Failure to disambiguate PSCs can cause problems when processing certain UMTS Measurement Report Messages, such as an Event 1A or 1C, when a services node attempts to add a new cell to a UE's active set. Along with the detected PSC and signal strength, the UE may also report a timing offset (i.e., frame offset and chip offset) for the PSC in the measurement report. The timing offset can be used by the services node to configure an appropriate radio link on a chosen cell. That is, and since each radio node can maintain its own system frame number (SFN) cycle at the cell level, the timing offset reported by the UE can be used to synchronize the connection frame number (CFN) cycle (which is maintained by, e.g., the RNC for the timing relation between UE and UTRAN) on the new cell with the CFN cycle of the existing radio link. When the services node chooses a different cell, a PSC disambiguation failure may result because a radio link is created on that cell with the timing offset which was reported by the UE. Thus, when the UE and Node B attempt a synchronization procedure B (i.e., when one or more radio links are added to the UE's active set on a frequency, and at least one of the radio links prior to establishment/reconfiguration still exists thereafter) for the new radio link, because the radio link has been created on a different cell than what the UE is referring to, the synchronization procedure B will most likely fail.

This failure can result in the Node B not triggering a Radio Link Restore indication to the services node. That is, and as part of the synchronization procedure B, the UTRAN attempts to establish uplink chip and frame synchronization. However, if the Node B receives some number of successive IN SYNC indications from radio layer 1 (L1), it may trigger a Radio Link Restore indication for the new radio link. This is likely to fail so the services node will not receive a Radio Link Restore indication for the new radio link.

Additionally, failure of the synchronization procedure B can also result in frame protocol (FP) timing errors. That is, and if the synchronization procedure B fails, the CFN timing at the two Node Bs will be different. Any downlink data sent over the FP on the new radio link will result in a Node B sending back an FP Timing Deviation Indication. The radio link will not be able to send out any downlink data. Moreover, FP will try to adjust the timing based on the slower radio link. If the services node detects that the newly added radio link is slower, FP timing will be synchronized to this radio link and the even the "good" radio link will be unable to send any downlink data.

Eventually, the Node B may report a radio link failure for the new radio link and the services node may delete it from the UE's active set. However, the UE will continue to report the PSC in measurement reports. Accordingly, the services node may attempt to add the new radio link again after the radio link drops due to radio link failure, leading to unnecessary soft handover operations. It should be noted that as long as FP does not attempt to drive timing based on this newly added radio link, a call can remain in progress because of the other radio link. However, it is possible that the UE may report an event 1B (i.e., primary CPICH leaves reporting range, of neighbor cell power has decreased out of reporting range) for the good/operative radio link. Therefore, and in response, the good/operative radio link may be deleted, eventually resulting in a dropped call due to radio link failure or radio link control (RLC) reset.

Typically, in a conventional, homogeneous network, the RNC is fully aware of the neighbor topology, i.e., the RNC has full knowledge of each cell and the other neighbors (from an RF perspective) of that cell. That is, the neighbor list information may actually be transmitted by each cell in system broadcast messages or by the RNC in one or more Measurement Control Messages. This neighbor list information can be used by the UE to prioritize PSC detection in anticipation of a handover. When a neighbor is detected as being sufficiently strong, its PSC is reported by the UE in a measurement report.

In such a homogenous network, the entire neighbor topology may be managed and fully determined. The RNC is in a position to map the PSC reported by a UE to a full triplet (PSC, CellID, RNCID) since it is aware of the cells in the UE's active set, and the neighboring cells in that location (as described above). Therefore, the RNC is able to fully disambiguate the PSC, and conclusively identify the target cell for a handover. This approach works if the topology can be manually determined and maintained following any changes in the deployment. However, this approach does not scale well. For example, considering a deployment of a large number of femtocells in the shadow of a macrocellular network, handovers from a macrocell to a femtocell would require disambiguation of a PSC reported by a UE. In principle, this would not be a problem if every femtocell had a unique PSC. However, because of the limited range of PSCs imposed by physical layer processing and UMTS signaling constraints, as well as the logistics of managing PSCs used by femtocells in neighbor lists broadcast by macrocells, it is not feasible to assign a unique, or even a locally unique PSC per femtocell. Even in a "reasonable" femtocell deployment, it is likely that several femtocells within the shadow of a single macrocellular sector are assigned the same PSC.

Alternatively, the disambiguation can be fully performed by the UE as it reads the neighbor lists broadcast by any cell that is connects with, and can map a detected PSC to the triplet (PSC, CellID, RNCID) and report this triplet back. In pre-Release 8 UMTS specifications, though, only the PSC is required to be reported, and most, if not all, UE implementations comply only with this minimum requirement.

As described above, PSC disambiguation may be effectuated by virtue of, e.g., manual neighbor topology management. However, such PSC disambiguation is still merely based on the strongest cell with a particular PSC detected by REM scanning. If the UE is reporting a different cell than the one selected by a services node, PSC disambiguation failure may still occur.

Still other conventional PSC disambiguation methods may rely on RF detection and automated PSC assignments. That is, PSC assignments may be performed through auto configuration procedures on the Services Node or through an O&M entity on the Services Node or external to it. The decision as to which PSC to assign to a cell may be based on the following: a configured range of alternate PSCs; a configured range of general pool PSCs; and RF scanning results of macro advertised PSCs.

Regarding the configured range of alternate PSCs, such PSCs are to be assigned to a subset of radio nodes which are on the periphery of a deployment to enable Idle Mode Reselection from the macrocell network to the ERAN. Since the macrocell network advertises these PSCs from all UMTS/GSM cells, it reduces the number of actual UMTS macrocell PSCs that can be advertised by the macrocells. Accordingly, the subset of these PSCs is typically small. In certain deployments, an operator provided a set of, e.g., six PSCs to use as alternate PSCs. However, and in a typical multi-story deployment, six PSCs may not be enough to cover all entry points through which a user may enter the ERAN coverage area, thus necessitating some level of PSC reuse for these alternate PSCs.

As to the configured range of general pool PSCs, such PSCs are "normal" PSCs (as opposed to the alternate PSCs described above) that are intended for assignment within the ERAN coverage area. While this PSC range will generally be different than the alternate PSC range and will be much larger, a deployment can exist where the entire ERAN uses alternate PSCs, or the internal PSC range provided by operator is small, and therefore, results in PSC reuse in internal cells as well.

While the PSC assignment phase attempts to minimize PSC reuse in cells which are in close RF proximity of each other, an automated algorithm is unlikely to provide an optimal PSC assignment due to various factors, including, but not necessarily limited to the following. First, there may be a limited range of assignable alternate PSCs as previously discussed. Second, consideration is given to the number and locations of the ERAN-to-Macro idle mode handover areas. Third, physical characteristics of a deployment area, e.g., the topology, may be skewed because of physical obstructions which affect the RF propagation characteristics between the radio nodes, but not between the UE and the radio nodes. Fourth, reciprocity may not always be satisfied because of the way radio nodes have been placed and because of the physical characteristics of a building, where new cell addition uses reciprocity to update neighbor tables. Fifth, power training and manual tuning may result in the changing of transmit powers of the cells, which in turn, can affect neighbor topology. While it is possible to take this correction into account by offsetting a detected received signal code power (RSCP) in the neighbor table for that cell by a certain amount depending on the change in transmit power, it may not be an actual reflection of the change in RF environment caused by modifying the cell transmit power.

Accordingly, and even though neighbor topology may be optimal from an RFMgmt perspective, it may not be optimal from the perspective of the UE. The neighbor topology may be such that a certain first tier neighbor with a certain PSC as the neighbor is chosen, whereas a UE, based on its area of mobility, may be closer to a different internal cell with the same PSC, for example.

In accordance with various embodiments, a radio link having the same PSC as that reported by the UE may be created on some or all internal cells. The set of internal cells can be chosen based on their RF proximity to a current serving cell or some other selection criteria/algorithm (discussed in greater detail below). Additionally, all of these radio links can be created with the same OVSF code and with the cell synchronization information/timing offset (i.e., frame offset and chip offset) reported by the UE. If the UE is reporting the PSC of one of these cells, the UE and one of the Node Bs will be able to successfully complete a synchronization procedure B, and the services node should receive a Radio Link Restore indication for that particular radio link. Once a Radio Link Restore indication is received from one of the radio links, the other radio links can be deleted.

It should be noted that once a certain number of successful radio link additions have occurred, the services node can "peg" the cell associated with the radio link additions against the PSC as a neighbor of the UE's serving cell (or UE's active set). Accordingly, such a cell may be thought of as "PSC Resolved" for that particular active set and PSC combination. Any subsequent soft handover requests for the same active set/PSC combination no longer require a radio link to be created on multiple cells. Similarly, if more than a certain number of successive failures are observed (i.e., there are no Radio Link Restore indications received for the PSC Resolved cell, the active set and PSC combination may be declared to be "Unresolved"), and the resolution procedure may be repeated. This could indicate, for example, a change in the RF environment caused by structural changes to the deployment area, where such an event could trigger some type of alarm. It should be noted, however, that receiving an active set Update Complete message from the UE does not necessarily suggest that a cell is PSC Resolved. That is, the Radio Resource Management (RRM) Layer at the UE does not wait for the results of a synchronization procedure B from its physical layer before sending out the active set Update Complete message.

Furthermore, the services node can maintain a hash table for each active set and PSC combination, where the active set refers to the serving cell and soft handover cell, and the PSC can be a re-used PSC. The key for this hash table can be a concatenation of the following: "ServingCellHdl+ SHOCellHdl+PSC." Each entry within the hash table can contain the following parameters: (1) "State," which can refer to a resolution state of an entry, e.g., RESOLVING, RESOLVED, UNRESOLVING, or RESOLUTION_ FAILED; (2) "PSC Resolution Set", which can refer to an array of size MAX_PSC_CELL_SET_SIZE, where each array element may include the parameters "CellHandle," i.e., a cell identifier of one of the cells which is configured with the Resolution PSC, and "NumSuccess," i.e., a value indicative of the number of times a resolution attempt for the PSC succeeded on the cell, which can be incremented each time an Radio Link Restore indication is received on this cell during a resolution attempt; and (3) a counter for "TotalAttemptCount," which can be incremented each time an attempt is made to resolve the PSC. If the UE is not in soft handover, the key for the hash table can be constructed as follows, "ServingCellHdl+0+PSC."

In accordance with various embodiments, use of a UE's active set (instead of just the UE's serving cell) can provide better control/success rate with respect to the PSC resolution procedure described above. That is, and the serving cell being the same, the other cell(s) in an active set may determine the location of the UE. Based on its location relative to the serving cell, the UE could be seeing different cells with the same re-used PSC.

The hash table may be populated dynamically, and therefore, may only contain entries for valid combinations of active set and reported PSC, i.e., only for the PSCs which trigger an Event 1A/1C as reported by the UE in measurement reports.

In accordance with various embodiments, a "PSC Resolution Set" can refer to the set of internal cells which are chosen as part of the PSC resolution procedure. It should be noted that the various embodiments described herein are disclosed in the context of a simplified scenario, where the size of the PSC Resolution Set can be large enough to include all the internal cells which have been configured with the same PSC. This can be done so that the PSC Resolution procedure will attempt to create a radio link on all cells with the same PSC during each PSC resolution attempt.

Although such an approach is contemplated to suffice in most deployment scenarios, other scenarios where the size of the PSC Resolution Set may not include all the internal cells are also contemplated in accordance with other embodiments. That is, and if needed, the PSC resolution procedure can be modified to work with a smaller resolution set, and perform multiple iterations of the PSC resolution procedure to resolve the PSC. In each iteration, the PSC Resolution Set can be determined based on results of the REM scan, and may contain a number of elements referred to as the "MAX_PSC_CELL_SET_SIZE" elements, which may be a predetermined maximum value.

In accordance with one example, selection of the PSC Resolution Set may be determined as follows. A cell may be ignored if it has already been included in a current or previous iteration of the PSC resolution procedure. All cells with the same PSC which were detected by the serving cell of the UE are selected. All cells with this same PSC which were detected by another cell in the active set of the UE are selected if the UE is in a soft handover. The strongest detected first tier neighbor cell with this PSC can be selected for all first tier neighbors of the serving cell. From all the internal cells with this given PSC, the PSC Resolution Set may be selected. The process of selection may be terminated when the number of selected cells reaches the MAX_PSC_CELL_SET_SIZE number of cells.

If a cell with a reused PSC is topologically disconnected (i.e., it does not appear as a neighbor of any internal cell or belongs to a group of cells that is topologically disconnected from the rest of the ERAN), the PSC Resolution set selection process may yield a satisfactory result after some number of iterations using, e.g., a smaller MAX_PSC_CELL_SET_SIZE. If the value of MAX_PSC_CELL_SET_SIZE is sufficiently large, so that all cells can be included in the PSC Resolution Set in the same iteration, then the first iteration will be able to resolve the PSC.

A reused PSC can be declared as being "Resolved," if there have been MAX_RESOLUTION_ATTEMPTS consecutive resolution attempts that have succeeded on the same internal Cell, as alluded to above. A resolution attempt is considered as successful if: (1) a Radio Link Restore indication is received; and (2) if no FP Out of Sync messages are seen on that particular radio link.

If the services node does not receive Radio Link Restore indication before an Active Set Update Complete message is received, the services node can wait an additional amount of time, e.g., "T_SYNCWAIT_RSLV" ms to receive the Radio Link Restore indication. Multiple radio links will be created during the PSC resolution procedure (if the PSC is reused) for each resolution attempt until, for example, a predetermined maximum number of attempts have been made, denoted by, "MAX_RESOLUTION_ATTEMPTS." The higher the reuse of the PSC, generally, the higher number of attempts are made to resolve the PSC. The PSC resolution procedure may also take into account how close the cells with the same PSC are to one another. This value can be configurable. Similarly, if MAX_RESOLUTION_ATTEMPTS successive resolution failures are encountered for a RESOLVED entry (within the hash table), the entry may be deleted, and the PSC resolution procedure can be started when a next soft handover procedure is attempted. This could indicate a change in the RF environment, and that an alarm should be raised (as previously noted).

The result of the PSC resolution procedure for each entry (active set and PSC) could be one of the following: (1) "Successful," which can suggest that all attempts were successful on the same internal cell; (2) "Indeterminate," which can suggest that attempts were successful on more than a single internal cells; and (3) "Failure," which can suggest that none of the attempts were successful.

If resources are not available (e.g., Admission Control failure) on some of the cells in the PSC Resolution Set, the resolution attempt will be made on a partial list of cells. If the attempt is successful, it may be considered a valid attempt. If the attempt is a failure, the attempt can be ignored. It should be noted that in the case of a failed attempt in this case, the TotalAttemptCount counter need not be incremented. Additionally, and in order to improve accuracy of the results, a PSC resolution procedure attempt need not be considered a failure if the UE reported Event 1A/1C has a sufficiently low signal strength (e.g., less that 105 dB). Also, if the session disconnects abnormally in the middle of a PSC resolution procedure attempt, the attempt need not be considered a failure.

It should be noted that creating multiple radio links on cells with the same PSC suggests that the same OVSF code be reserved on each of the cells (as alluded to above). This can be accomplished by pre-reserving some number (e.g., two) of SF-128 codes on each cell specifically for this purpose. These can be returned back to the general pool if the cell is running out of OVSF codes. If no OVSF code from the pre-reserved codes is available, Admission Control can return a failure indicator for that particular cell. Once the soft handover procedure is complete (i.e., an Active Set update complete indication has been received), the radio link on the cell from which the Radio Link Restore indication was received can be reconfigured to a different OVSF code through a Radio Bearer Reconfiguration procedure so that the pre-reserved code is available again for another PSC resolution procedure.

It should be further noted that an uplink chain (Radio Link Resource) should be available for Mobility Addition on all the cells. If a radio link is not available for Mobility Addition, Admission Control can return a failure indication for that particular cell. Moreover, and as long as at least one of the cells passes the Admission Control check, the soft handover procedure continues. If none of the cells passes the Admission Control check, the soft handover procedure is aborted and no changes are made to the PSC resolution hash table entry.

In the case of R99 data sessions, where OVSF code requirements are high, the services node may decide not to perform a PSC Resolution procedure for R99 data sessions. Additionally, radio link creation in accordance with various embodiments on multiple cells may be performed in parallel to make the procedure faster.

Figure 4:
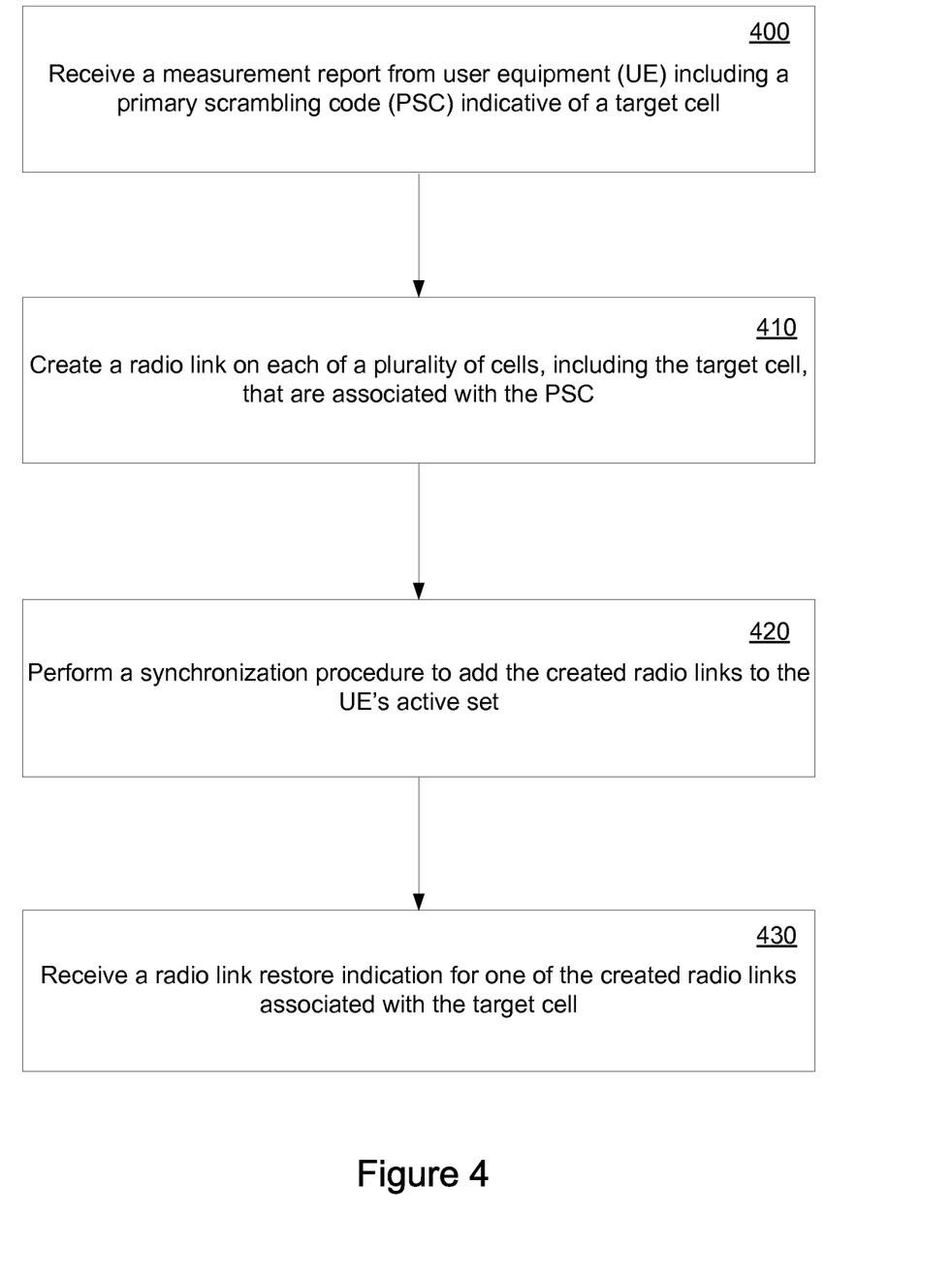
FIG. 4 is a flow chart illustrating a process in accordance with an embodiment of the invention.

FIG. 4 is a flow chart illustrating example processes performed to achieve PSC resolution in accordance with various embodiments. As described above, a measurement report is received from a UE that includes a PSC indicative of a target cell (to which the UE may wish to handover) (block 400). Again, radio links may be created on some, if not all, internal cells, where the set of internal cells can be chosen based on their RF proximity to a current serving cell or some other selection criteria/algorithm. A radio link is created on each of a plurality of cells, including the target cell, that are associated with the PSC (block 410). As described above, all of these radio links can be created with the same OVSF code and with the cell synchronization information/timing offset reported by the UE. A synchronization procedure, i.e., synchronization procedure B, is performed to add the created radio links to the UE's active set (block 420). A radio link restore indication is received for one of the created radio links associated with the target cell (block 430). That is, and if the UE is reporting the PSC of one of these cells, the UE and one of the Node Bs will be able to successfully complete a synchronization procedure B with the desired target cell, and the services node should receive a Radio Link Restore indication for that particular radio link, and the other radio links can be deleted.

There may be multiple applications of the PSC resolution procedure described herein. For example, the PSC resolution procedure may be utilized to detect errors in network topology. That is, and once an REM Scan is complete, and the system is operational, PSC resolution can be performed (triggered by a command line interface (CLI) command), and the results can be viewed by an operator after some time (e.g., after a day of normal operation or after doing walkaround testing). If after the resolution procedure, there are entries which have been successfully resolved, but the resolved cell is different than what appears in the neighbor list, the neighbor list can be modified by pointing the PSC to the new cell. If a combination of the active set and PSC failed the PSC resolution procedure or the results were indeterminate (resolved to multiple cells), either the PSC assignment can be modified or the neighbor list entry can be deleted to prevent disambiguation failures. It is possible that "SrvCell+SHOCell1+PSC" resolved to CELL_A and "Srv-Cell+SHOCell2+PSC" resolved to CELL_B, and similar corrective actions may be taken if that occurs. If PSC resolution is performed based only on the serving cell, this can be considered to be equivalent to an indeterminate result (as described previously).

Another use of PSC resolution may be for the auto-correction of neighbor lists: That is, and instead of manually fixing a neighbor list (as is conventionally done), the same actions can be taken automatically by the software. Any changes to the neighbor list can be conveyed to, for example, an O&M entity either on the Services Node or external to it which can then update the database maintaining the neighbor list with the new neighbor relations. For example, any neighbor entries which caused a resolution failure or indeterminate results can be deleted. Alternatively, if the PSC resolution procedure produces a different result than what is in the neighbor list, the target cell handle can be modified.

Yet another benefit of PSC resolution in accordance with various embodiment may arise in the form of better soft handover performance. For example, and instead of neighbor lookup being based solely on a serving cell, the other cell in a UE's active set can be taken into account, where the target cell may be selected based on a ServingCell+SHOCell combination for reused PSCs resulting in better soft handover performance and fewer failures. Depending on the density of deployment and the degree of PSC reuse, the scenario alluded to above regarding resolution to two cells (Cell_A and Cell_B) may be possible. Mover, and adding the parameter "SoftHandoverCell" as another parameter for Neighbor List lookup can improve soft handover success. If the neighbor relation (Active Set, Neighbor Handle) can be stored in the database, the PSC Resolution results can be available after a system reboot. Further still, and in the case of multiple candidate target cells for a particular PSC (i.e., PSC the resolution procedure resulted in successful attempts on two different internal cells), the system could create a radio link on both potential target cells, and thus improve the possibility of successful handover.

Further still, automatic creation of neighbor relations may be accomplished. For example, it is possible that an REM scan does not detect neighbors for some internal cell or a set of cells are topologically disconnected. Even though a UE can see another cell and can be in soft handover, the services node will not act on the measurement report because the cell does not exist in the neighbor list of the cell. If the PSC is not reused, it is straightforward to act on the soft handover operation instead of discarding the measurement report. However, if the PSC is reused, it may not be possible to identify a unique target cell. Performing PSC resolution in such a scenario may help create a new neighbor relationship and the neighbor list of the cell can be updated.

Having such a relationship in the neighbor list of the cell (through the database) can be desirable instead of acting on a detected cell in the Measurement Report because the UE has more stringent measurement requirements for PSC in a monitored set than a detected set. Thus, if the PSC can be advertised in the CELL_INFO_LIST to the UE, more reliable measurement reports from the UE can be expected. Additionally, creating a neighbor relation allows the ERAN to advertise this in a system information message block 11 (SIB11). That is, and once the PSC of a cell has been identified, the PSCs of its neighboring cells can be detected by decoding UMTS system information block 11 (SIB11), SIB11bis and/or SIB12 on the broadcast channel (BCCH). This knowledge can be used to avoid PSC collision when new PSCs are assigned and also help in idle mode reselection.

Still another advantage of PSC resolution may come in the context of detecting macrocell reconfiguration. That is, PSC resolution may be utilized to detect if there is a PSC collision between the macrocell and ERAN. For example, it is possible that during an REM Scan, PSC A was not detected and was assigned to one (or possibly more) internal cells. After the network is operational, the macro network could decide to turn on a cell with the same PSC A in the neighborhood of the ERAN deployment causing interference and soft handover failures. The UE could be actually reporting the macrocell, but adding the internal cell to the UE's active set would be repeatedly attempted, thereby causing failures. With the PSC resolution procedure, such a macro reconfiguration would be easy to detect, since reporting and raising an alarm is performed for PSC Resolution failure on the internal cells where the macrocell is interfering.

While various embodiments have been described above for a UMTS system, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in a computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Various embodiments may comprise a computer-readable medium including computer executable instructions which, when executed by a processor, cause an apparatus to perform the methods and processes described herein.

Furthermore, embodiments of the present invention may be implemented in software, hardware, application logic or a combination of software, hardware and application logic. The software, application logic and/or hardware may reside on a client device, a server or a network component. If desired, part of the software, application logic and/or hardware may reside on a client device, part of the software, application logic and/or hardware may reside on a server, and part of the software, application logic and/or hardware may reside on a network component. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. In one embodiment, the computer-readable storage medium is a non-transitory storage medium.

What is claimed is:

1. A method comprising:
   instructing user equipment (UE) to conduct radio frequency (RF) measurements of certain radio nodes in a network based on a received primary scrambling code (PSC);
   instructing the UE to send the RF measurements to the network only if the RF measurements meet a predetermined condition:
   receiving, at the network, a measurement report from the UE including a PCS indicative of a target cell;
   creating a radio link between the UE and a radio node on each of a plurality of cells, including the target cell, that are associated with the PSC;
   performing a synchronization procedure to add the created radio links to the UE's active set; and
   receiving a radio link restore indication for one of the created radio links associated with a radio node on the target cell; and
   creating the radio link between the UE and a radio node on each of the plurality of cells with the same orthogonal variable spreading factor (OVSF) code and the same timing offset information.

2. The method of claim 1 further comprising, deleting the remainder of the created radio links.

3. The method of claim 1, wherein the plurality of cells comprises at least a subset of internal cells.

4. The method of claim 3 further comprising, determining whether a cell belongs in the subset of internal cells by performing at least one of the following:
   ignoring a cell if the cell has previously been included in the subset;
   selecting the cell if the cell was detected by a serving cell of the UE;
   selecting the cell by a second cell within the active set of the UE; and selecting the cell if the cell is a strongest detected first tier neighbor cell.

5. The method of claim 1 further comprising, repeating the synchronization procedure to add the created radio links for a predetermined number of iterations.

6. The method of claim 5 further comprising, pegging the PSC with the target cell as a neighbor of the active set of the UE, and assigning a resolved status to a combination of the PSC and the active set.

7. The method of claim 6 further comprising, maintaining the combination of the PSC and the active set as an entry in a dynamically populated hash table.

8. The method of claim 5 further comprising, pegging the PSC with the target cell as a neighbor of the active set of the UE, and assigning an unresolved status to a combination of the PSC and the active set if the repeating of the synchronization procedure results in a predetermined number of failures to receive the radio link restore indication.

9. An apparatus comprising: a processor; and
a memory including computer program code, the memory and the computer program code configured to, with the at least one processor, cause the apparatus to perform at least the following:
instructing user equipment (UE) to conduct radio frequency (RF) measurements of certain radio nodes in a network based on a received primary scrambling code (PSC);
instructing the UE to send the RF measurements to the network only if the RF measurements meet a predetermined condition;
receive, at the network, a measurement report the UE including a PSC indicative of a target cell;
create a radio link between the UE and a radio node on each of a plurality of cells, including the target cell, that are associated with the PSC;
perform a synchronization procedure to add the created radio links to the UE's active set; and
receive a radio link restore indication for one of the created radio links associated with a radio node on the target cell; and
create the radio link between the UE and a radio node on each of the plurality of cells with the same orthogonal variable spreading factor (OVSF) code and the same timing offset information.

10. The apparatus of claim 9, wherein the memory and the computer program code configured to, with the at least one processor, further cause the apparatus to delete the remainder of the created radio links.

11. The apparatus of claim 9, wherein the plurality of cells comprises at least a subset of internal cells.

12. The apparatus of claim 9, wherein the memory and the computer program code configured to, with the at least one processor, further cause the apparatus to repeat the synchronization procedure to add the created radio links for a predetermined number of iterations.

13. The apparatus of claim 12, wherein the memory and the computer program code configured to, with the at least one processor, further cause the apparatus to peg the PSC with the target cell as a neighbor of the active set of the UE, and assign a resolved status to a combination of the PSC and the active set.

14. A computer program product embodied on a computer-readable non-transitory medium comprising:
computer code for instructing user equipment (UE) to conduct radio frequency (RF) measurements of certain radio nodes in a network based on a received primary scrambling code (PSC);
computer code for instructing the UE to send the RF measurements to the network only if the RF measurements meet a predetermined condition:
computer code for receiving a measurement report from the UE including a PSC indicative of a target cell;
computer code for creating a radio link between the UE and a radio node on each of a plurality of cells, including the target cell, that are associated with the PSC;
computer code for performing a synchronization procedure to add the created radio links to the UE's active set; and
computer code for receiving a radio link restore indication for one of the created radio links associated with a radio node on the target cell; and
computer code for creating the radio link between the UE and a radio node on each of the plurality of cells with the same orthogonal variable spreading factor (OVSF) code and the same timing offset information.

* * * * *